May 6, 1930.  N. KOOMANS  1,757,910
NEUTRODYNE CIRCUIT ARRANGEMENT

Filed Aug. 2, 1926

Inventor:
Nicolaas Koomans,
by Langner, Parry, Card & Langner
Att'ys.

Patented May 6, 1930

1,757,910

UNITED STATES PATENT OFFICE

NICOLAAS KOOMANS, OF THE HAGUE, NETHERLANDS, ASSIGNOR TO RADIO CORPORATION OF AMERICA, OF NEW YORK, N. Y., A CORPORATION OF DELAWARE

NEUTRODYNE CIRCUIT ARRANGEMENT

Application filed August 2, 1926, Serial No. 126,619, and in the Netherlands August 19, 1925.

Various means have been proposed to eliminate the capacity between the plate and the grid of a three-electrode valve causing a coupling between the plate and the grid circuits by arranging between the said two circuits a second capacitive connection, which by its opposite action neutralizes the influence of the first mentioned capacitive connection.

The present invention has reference to a neutrodyne circuit arrangement in which the capacity between the controlling grid and the plate is neutralized by the use of a fourth electrode.

Figure 1:
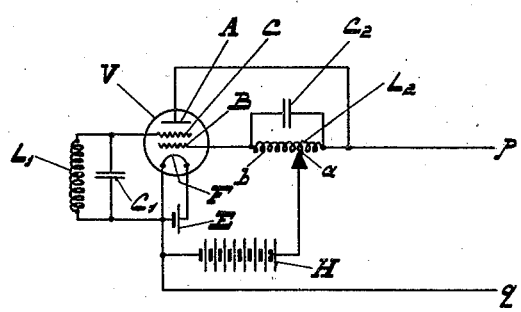
Figure 2:
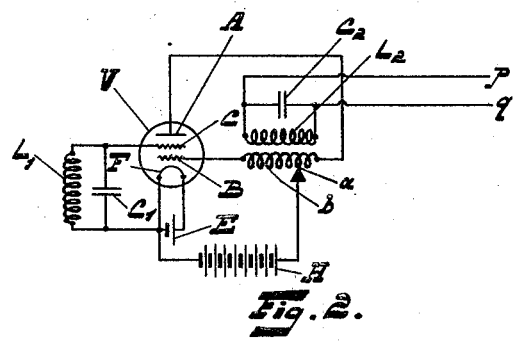

The invention will be clearly understood by reference to the accompanying drawings, in which Figure 1 shows an embodiment in which the multi-electrode valve V consists of an ordinary double grid valve, and Figure 2 shows another embodiment of slightly different form.

As a matter of fact the circuit arrangement is in the first place connected with high or medium frequency amplification (superheterodyne). In the case of low-frequency currents the capacitive action between the grid and the plate is of practically no importance.

For a better understanding of the illustration it may be mentioned that the double-grid lamp V illustrated has both its grid circuit $L_1 C_1$ and its anode circuit $L_2 C_2$ syntonized, which usually is the case with these kinds of amplification.

It will, however, be obvious that these circuits may also consist of inductance coils only, provided such coils have a suitable self-capacity and not too high a damping decrement.

The valve V comprises a filament F heated by a battery E, a so-called front grid B, a controlling grid C and an anode A. The inductance $L_2$ of the plate circuit consists of a coil $b$, one extremity of which is connected to the plate A, the other extremity to the front grid B, an intermediate point $a$ being connected to the positive terminal of the plate battery H.

It is to be remarked that the two parts of the coil $b$ on either side of the point $a$ need not be inductively coupled with each other, so that the inductance $L_2$ may even consist of two separate coils connected in series, widely spaced apart.

It is to be understood that subsequent to the illustrated valve there are one or more further valves which are connected in any suitable manner, for example by means of the conductors $p$ and $q$, to the valve V.

In a simple manner it is theoretically possible and can be practically demonstrated that the point $a$ where the anode battery should be connected to the inductance $b$ depends on the ratio of the capacities between the controlling grid C and the plate A on the one hand and between the controlling grid C and the second grid B on the other hand. Strictly taken the small capacities of the external wires and members connected to the said parts should be taken into account.

If the said two capacities are equal $a$ should lie in the middle of $b$.

If the said capacities are unequal $a$ should be shifted proportionally.

From the foregoing it will be clear that the invention involves a logical combination of the neutrodyne principle and the characteristic features of a double-grid valve.

In the explanation given the point $a$ is supposed to be slidable. In practice this point may be stationary in the middle of $b$ and a compensating adjustment may be added by the arrangement of an additional external condenser (not shown) between the controlling grid and the plate or between the controlling grid and the second grid.

The double grid valves however may be so constructed, that the latter compensation is not necessary, although the tapping point $a$ be fixed.

Figure 2 shows an arrangement of parts, which differs from the diagram given in Figure 1 in that the syntonized output circuit $L_2 C_2$ is coupled inductively to the inductance $b$ of the anode circuit.

Other solutions, although obviously possible, will not be described. At the present state of knowledge as regards the neutrodyne and after the foregoing explanation of the given principle such solutions, the number of which is practically unlimited, will be evident to anyone acquainted with this branch of the art.

All these solutions have one feature in common, viz, that the voltage of the front grid which relative to the voltage of the plate is out of phase by about 180° is used in order to prevent the retroaction from the plate circuit to the grid circuit.

The possibility of correcting a phase difference of 180° by the arrangement of extra reactances is also contemplated but is likewise too evident to be fully described here.

What I claim is:—

1. A device for the amplification of electric oscillations comprising at least one thermionic valve, the effect of the internal capacity between the plates and the controlling grids of such valves being reduced by the provision of a fourth electrode in each valve which is so connected in the circuit that the potential variations occurring at the anode are substantially 180° out of phase with those occurring at the said fourth electrode, in which the output circuit of each valve comprises an inductance, the terminals of which are connected to the plate and fourth electrode of said valve respectively, an intermediate point of said inductance being connected to a source of high tension direct current.

2. A circuit for neutralizing the capacitive effect between plate and control grid of a thermionic valve comprising a fourth electrode positioned between the cathode and control grid, an inductance connected to said fourth electrode, an inductance connected to said plate electrode, a condenser connected across the terminals of said inductances for tuning the inductances, a source of high tension direct current connected to said plate and fourth electrode through said inductances, said connections being such that the potential variations upon the fourth electrode are 180° out of phase with the potential variations upon the plate, and output connections to said plate and filament.

3. An electrical amplifier comprising a vacuum tube having an emitting cathode, an anode, a control grid, and a second grid, an input circuit connected between said cathode and said control grid, an output circuit connected between said cathode and said anode, and means associated with one of said circuits for impressing upon said second grid a compensating voltage of the proper phase and amplitude to oppose feedback currents flowing through the capacities of said vacuum tube between said anode and said control grid.

4. An electric amplifier comprising a vacuum tube having an emitting cathode, an anode, a control grid, and a second grid, an input circuit connected between said cathode and said control grid, an output circuit connected between said cathode and said anode, and a coil connected between said cathode and said second grid, and coupled to a coil in one of said circuits in such a way as to impress upon said second grid a compensating voltage of the proper phase and amplitude to oppose feed-back currents flowing through the capacities of said vacuum tube between said anode and said control grid.

5. In an amplifier, a vacuum tube provided with a filament, a grid and an anode, an input circuit connecting said grid and said filament, an output circuit including a primary winding and a source of potential connecting said anode and said filament, a neutralizing circuit including a neutralizing winding coupled to said primary winding and connected to a point on said output circuit having an opposite alternating current potential from that applied to said anode, said neutralizing circuit being capacitively connected to said grid through capacity within said vacuum tube.

6. In an amplifier, a vacuum tube provided with a cathode, a grid and an anode whereby inherent capacity exists between said grid and said anode through which an alternating potential may be applied to said grid, an input circuit connecting said grid and said cathode, an output circuit including a coil and a source of potential connecting said anode and said cathode, and an arrangement for neutralizing the inherent capacity between said grid and said anode which includes means for applying an alternating potential to said grid through a supplemental inherent capacity within said vacuum tube which potential is of opposite phase but of equal potential to that applied to said grid through said first mentioned inherent capacity.

7. In an amplifier, an electron discharge device provided with a cathode, a grid, an anode, and a fourth electrode, said grid and said anode having an inherent capacity existing therebetween, an input circuit connecting said grid and said cathode, an output circuit including a coil and a source of potential connecting said anode and said cathode, and means including a neutralizing coil connecting said fourth element and said cathode, said neutralizing coil being coupled to one of said circuits so that the voltage applied to said fourth electrode is of such phase and value as to neutralize the voltage impressed on the grid through the inherent capacity between said grid and said anode.

8. An electrical amplifier comprising an electron discharge device including an electron emission element, an anode, a control electrode, and an additional electrode, an input circuit connected between said emission element and said control electrode, an output circuit connected between said emission element and said anode, and means associated with one of said circuits for impressing upon said additional electrode a compensating voltage of proper phase and amplitude to oppose feed-back currents flowing through the inter-electrode capacities of said electron discharge device between said anode and said control electrode.

9. An amplifier comprising an electron discharge device including an electron emission element, an anode, a control electrode, and an additional electrode, an input circuit connected between said emission element and said control electrode, an output circuit connected between said emission element and said anode, and a coil connected between said emission element and said additional electrode, and coupled to a coil in one of said circuits in such a way as to impress upon said additional electrode a compensating voltage of the proper phase and amplitude to oppose feed-back currents flowing through the capacities of said electron discharge device between said anode and said control electrode.

In testimony whereof I affix my signature, at the city of The Hague, this 16th day of July, 1926.

NICOLAAS KOOMANS.